US011334412B2

(12) United States Patent
Busch et al.

(10) Patent No.: US 11,334,412 B2
(45) Date of Patent: *May 17, 2022

(54) DIGITAL BACKED FLASH REFRESH (71) Applicant: SYNTIANT, Irvine, CA (US)

(72) Inventors: Kurt F. Busch, Laguna Hills, CA (US); Jeremiah H. Holleman, III, Davidson, NC (US); Pieter Vorenkamp, Laguna Beach, CA (US); Stephen W. Bailey, Irvine, CA (US)

(73) Assignee: Syntiant, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/201,654

(22) Filed: Mar. 15, 2021

(65) Prior Publication Data
US 2021/0200617 A1 Jul. 1, 2021

Related U.S. Application Data (63) Continuation of application No. 16/892,035, filed on Jun. 3, 2020, now Pat. No. 10,949,281, which is a continuation of application No. 16/104,788, filed on Aug. 17, 2018, now Pat. No. 10,698,754.

(60) Provisional application No. 62/547,007, filed on Aug. 17, 2017.

(51) Int. Cl.
G06F 11/07 (2006.01)
G06N 3/063 (2006.01)
G06N 3/08 (2006.01)
G06N 3/10 (2006.01)

(52) U.S. Cl.
CPC ........ G06F 11/0757 (2013.01); G06F 11/073 (2013.01); G06F 11/079 (2013.01); G06F 11/0793 (2013.01); G06N 3/0635 (2013.01); G06N 3/08 (2013.01); G06N 3/105 (2013.01)

(58) Field of Classification Search
CPC . G06F 11/0757; G06F 11/079; G06F 11/0793
USPC .......................................................... 714/55
See application file for complete search history.

(56) References Cited

U.S. PATENT DOCUMENTS

| 6,421,757 | B1 | 7/2002 | Wang et al. |
| 8,856,055 | B2 | 10/2014 | Brezzo et al. |
| 2001/0040750 | A1 | 11/2001 | Murakami et al. |
| 2005/0075758 | A1 | 4/2005 | Wakefield |
| 2012/0271982 | A1 | 10/2012 | Callaghan |

(Continued)

OTHER PUBLICATIONS

International Search Report, PCT Application No. PCT/US18/46994, dated Nov. 2, 2018.

*Primary Examiner* — Joseph R Kudirka
(74) *Attorney, Agent, or Firm* — Ravi Mohan; Rutan & Tucker, LLP (57) ABSTRACT A method comprising the steps of responding to expiration of a timer, transmitting a signal from the timer to circuitry; responsive to receiving the signal, retrieving by the circuitry (i) first values stored in an analog array, and (ii) second values stored in a digital non-volatile memory; performing, by the circuitry, operations comprising a comparison of the first values and the second values; analyzing, by the circuitry, results of the comparison to determine whether an error is greater than or equal to a predefined threshold; responsive to determining the error is greater than or equal to the predefined threshold, initiating, by the circuitry, operations to reprogram the analog array with the second value is described.

20 Claims, 5 Drawing Sheets (56) References Cited

U.S. PATENT DOCUMENTS

2015/0006604 A1    1/2015   Ng et al.
2016/0182369 A1    6/2016   Vasudevan et al.

DIGITAL BACKED FLASH REFRESH

PRIORITY

This application is a continuation of U.S. patent application Ser. No. 16/892,035, filed Jun. 30, 2020, now issued U.S. Pat. No. 10,949,281, which is a continuation of U.S. patent application Ser. No. 16/104,788, filed Aug. 17, 2018, now issued U.S. Pat. No. 10,698,754, which claims the benefit of and priority to U.S. Provisional Patent Application No. 62/547,007, filed Aug. 17, 2017, all titled "Digital Backed Flash Refresh," which are incorporated by reference herein in their entireties.

FIELD

Embodiments of the disclosure related to the field of neuromorphic computing. More specifically, embodiments of the disclosure relate to systems and methods for reprogramming an analog array with values stored in a digital non-volatile memory device.

BACKGROUND

Traditional central processing units "CPUs" process instructions based on "clocked time." Specifically, CPUs operate such that information is transmitted at regular time intervals. Based on complementary metal-oxide-semiconductor "CMOS" technology, silicon-based chips may be manufactured with more than 5 billion transistors per die with features as small as 10 nm. Advances in CMOS technology have been parlayed into advances in parallel computing, which is used ubiquitously in cell phones and personal computers containing multiple processors.

However, as machine learning is becoming commonplace for numerous applications including bioinformatics, computer vision, video games, marketing, medical diagnostics, online search engines, etc., traditional CPUs are often not able to supply a sufficient amount of processing capability while keeping power consumption low. In particular, machine learning is a subsection of computer science directed to software having the ability to learn from and make predictions on data. Furthermore, one branch of machine learning includes deep learning, which is directed at utilizing deep (multilayer) neural networks.

Currently, research is being done to develop direct hardware implementations of deep neural networks, which may include systems that attempt to simulate "silicon" neurons (e.g., "neuromorphic computing"). Neuromorphic chips (e.g., silicon computing chips designed for neuromorphic computing) operate by processing instructions in parallel (e.g., in contrast to traditional sequential computers) using bursts of electric current transmitted at non-uniform intervals. As a result, neuromorphic chips require far less power to process information, specifically, artificial intelligence (AI) algorithms. To accomplish this, neuromorphic chips may contain as much as five times as many transistors as a traditional processor while consuming up to 2000 times less power. Thus, the development of neuromorphic chips is directed to provide a chip with vast processing capabilities that consumes far less power than conventional processors. Further, neuromorphic chips are designed to support dynamic learning in the context of complex and unstructured data.

When utilizing an analog array, values stored thereon may be susceptible to leakage or drifting, which may cause errors in the output voltage. Specifically, current leakage may be introduced to the circuitry of the analog array which may cause a voltage drift at the output. Provided herein are systems and methods for detecting current leakage or voltage drift and in response, reprogramming the analog array.

SUMMARY

Disclosed herein are methods of performing a digital backed flash refreshes. Although the description below contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

In many embodiments, the method includes in response to the expiration of a timer, transmitting a signal from the timer to circuitry, responsive to receiving the signal, retrieving by the circuitry first values stored in an analog array, and second values stored in a digital non-volatile memory, performing, by the circuitry, operations comprising a comparison of the first values and the second values, analyzing, by the circuitry, results of the comparison to determine whether an error is greater than or equal to a predefined threshold, responsive to determining the error is greater than or equal to the predefined threshold, initiating, by the circuitry, operations to reprogram the analog array with the second values.

Further embodiments include the timer being configured to expire at periodic intervals.

Additional embodiments include the intervals being selected from the set of one minute, two minutes, one hour, twenty-four hours or one week.

Still further embodiment include the intervals being dynamically generated.

Still additional embodiments include the error including a difference between one or more of the first values and corresponding values of the second values.

More embodiments include the threshold including a predefined percentage.

Still more embodiments include the threshold percentages being between ninety and one-hundred ten percent of the values stored in the digital non-volatile memory.

Still yet further embodiments include the error having a number of first values being outside of the corresponding ranges stored in the digital non-volatile memory.

Still yet additional embodiments include the threshold having a threshold number of first values or a predefined threshold percentage of first values.

Many more embodiments embodiment include reprogramming of the analog array being performed as a background refresh.

A number of embodiments include the background refresh having operations comprising programming a duplicate analog array with the second values stored in the digital non-volatile memory, and substituting the analog array with the duplicate analog array.

Even more embodiments include the analog array having a predefined capacity, and the background refresh includes operations comprising programming a unit memory bank of the analog array with a portion of the second values stored in the digital non-volatile memory, the unit memory bank and the portion of the second values having an equal size being a factor of a size of total of the analog array.

Another further embodiment includes the operations to reprogram being executed by a microcontroller.

Another such embodiment includes the operations to reprogram being executed by a state machine.

Yet further embodiments include the retrieval of the first values before the retrieval of the second values.

Yet additional embodiments include the retrieval of the second values before the retrieval of the first values.

Some embodiments include the retrieval of the first values and the second values concurrently.

Certain embodiments include the digital non-volatile memory being internal digital non-volatile memory.

Certain additional embodiments include the digital non-volatile memory being external digital non-volatile memory.

Further additional embodiments include the digital non-volatile memory being a combination of internal digital non-volatile memory and external digital non-volatile memory.

DRAWINGS

Embodiments of this disclosure are illustrated by way of example and not by way of limitation in the figures of the accompanying drawings, in which like references indicate similar elements and in which.

DESCRIPTION

Terminology

In the following description, certain terminology is used to describe features of the invention. For example, in certain situations, the term "logic" may be representative of hardware, firmware and/or software that is configured to perform one or more functions. As hardware, logic may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

The term "process" may include an instance of a computer program (e.g., a collection of instructions, also referred to herein as an application). In one embodiment, the process may be included in one or more threads executing concurrently (e.g., each thread may be executing the same or a different instruction concurrently).

The term "processing" may include executing a binary or script, or launching an application in which an object is processed, wherein launching should be interpreted as placing the application in an open state and, in some implementations, performing simulations of actions typical of human interactions with the application.

The term "object" generally refers to a collection of data, whether in transit (e.g., over a network) or at rest (e.g., stored), often having a logical structure or organization that enables it to be categorized or typed.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 1:
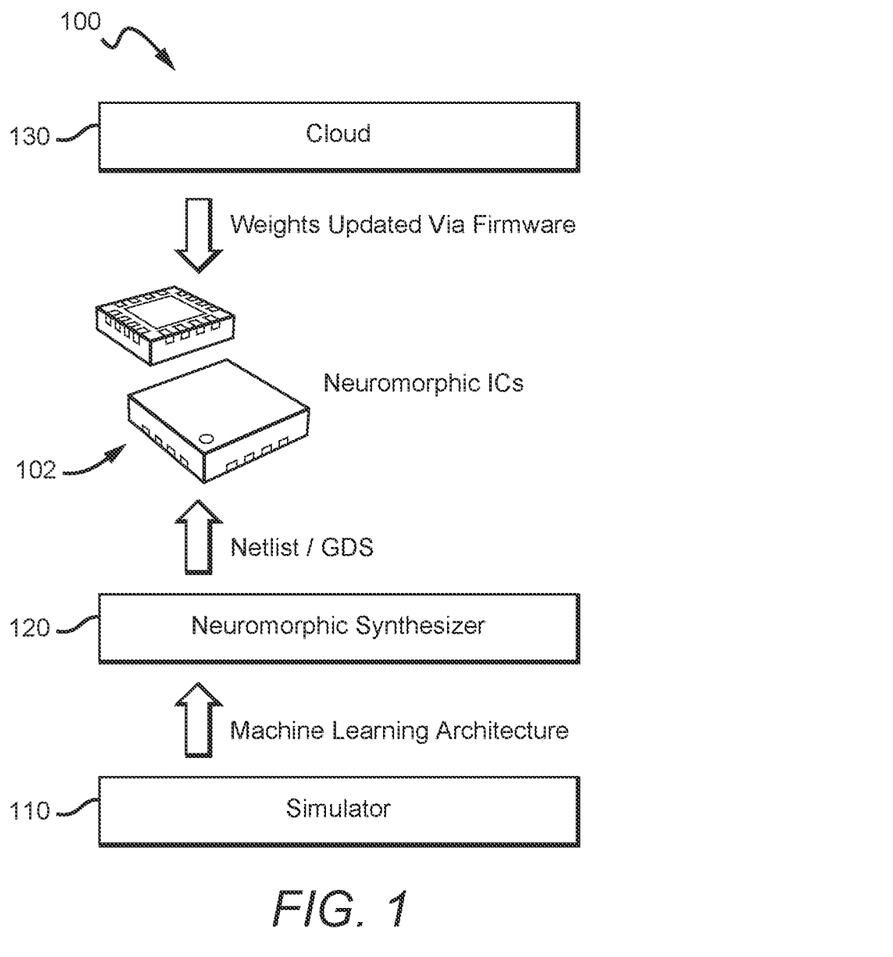
FIG. 1 provides a schematic illustrating a system 100 for designing and updating neuromorphic integrated circuits "ICs" in accordance with some embodiments.

Referring now to FIG. 1, a schematic illustrating a system 100 for designing and updating neuromorphic ICs is provided in accordance with some embodiments. As shown, the system 100 can include a simulator 110, a neuromorphic synthesizer 120, and a cloud 130 configured for designing and updating neuromorphic ICs such as neuromorphic IC 102. As further shown, designing and updating neuromorphic ICs can include creating a machine learning architecture with the simulator 110 based on a particular problem. As those skilled in the art can appreciate, cloud-based computer system may include, but are not limited to systems that can provide software as a service ("SaaS"), platform as a service ("PaaS"), and or infrastructure as a service ("IaaS") resources. The neuromorphic synthesizer 120 can subsequently transform the machine learning architecture into a netlist directed to the electronic components of the neuromorphic IC 102 and the nodes to which the electronic components are connected. In addition, the neuromorphic synthesizer 120 can transform the machine learning architecture into a graphic database system ("GDS") file detailing the IC layout for the neuromorphic IC 102. From the netlist and the GDS file for the neuromorphic IC 102, the neuromorphic IC 102, itself, can be fabricated in accordance with current IC fabrication technology. Once the neuromorphic IC 102 is fabricated, it can be deployed to work on the particular problem for which it was designed. While the initially fabricated neuromorphic IC 102 can include an initial firmware with custom synaptic weights between the nodes, the initial firmware can be updated as needed by the cloud 130 to adjust the weights. Being as the cloud 130 is configured to update the firmware of the neuromorphic IC 102, the cloud 130 is not needed for everyday use.

Neuromorphic ICs such as the neuromorphic IC 102 can be up to 100× or more energy efficient than graphics processing unit ("GPU") solutions and up to 280× or more energy efficient than digital CMOS solutions with accuracies meeting or exceeding comparable software solutions. This makes such neuromorphic ICs suitable for battery powered applications.

Neuromorphic ICs such as the neuromorphic IC 102 can be configured for application specific standard products "ASSP" including, but not limited to, keyword spotting, speaker identification, one or more audio filters, gesture recognition, image recognition, video object classification and segmentation, or autonomous vehicles including drones. For example, if the particular problem is one of keyword spotting, the simulator 110 can create a machine learning architecture with respect to one or more aspects of keyword spotting. The neuromorphic synthesizer 120 can subsequently transform the machine learning architecture into a netlist and a GDS file corresponding to a neuromorphic IC for keyword spotting, which can be fabricated in accordance with current IC fabrication technology. Once the neuromorphic IC for keyword spotting is fabricated, it can be deployed to work on keyword spotting in, for example, a system or device.

Neuromorphic ICs such as the neuromorphic IC 102 can be deployed in toys, sensors, wearables, augmented reality "AR" systems or devices, mobile systems or devices, appliances, Internet of things "IoT" devices, or hearables.

Figure 2:
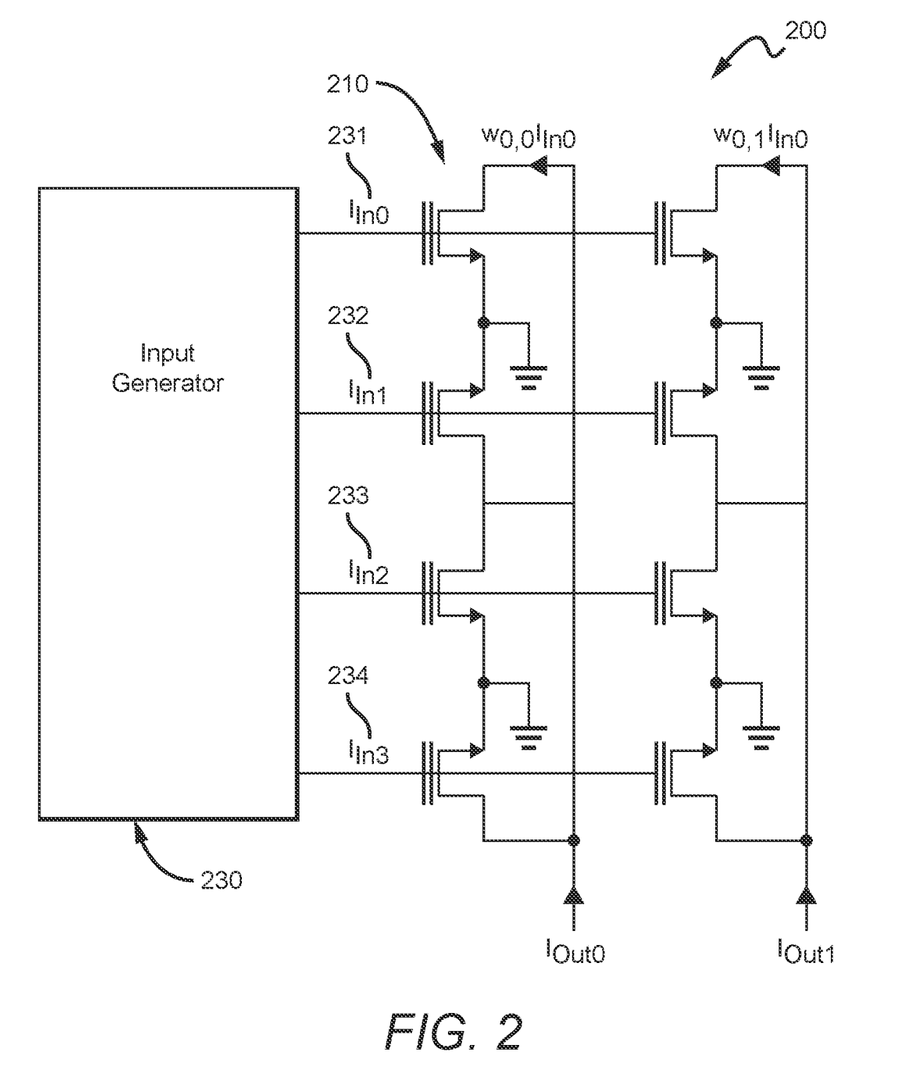
FIG. 2 provides a schematic illustrating an analog multiplier array in accordance with some embodiments.

Referring now to FIG. 2, a schematic illustrating an analog multiplier array 200 is provided in accordance with some embodiments. Such an analog multiplier array can be based on a digital NOR flash array in that a core of the analog multiplier array can be similar to a core of the digital NOR flash array or the same as a core of the digital NOR flash array. That said, at least select and read-out circuitry of the analog multiplier array are different than a digital NOR array. For example, output current is routed as an analog signal to a next layer rather than over bit lines going to a sense-amp/comparator to be converted to a bit. Word-line analogs are driven by analog input signals rather than a digital address decoder. Furthermore, the analog multiplier array 200 can be used in neuromorphic ICs such as the neuromorphic IC 102.

Since the analog multiplier array 200 is an analog circuit, input and output current values (or signal values) can vary in a continuous range instead of simply on or off. This is useful for storing weights (aka coefficients) of a neural network as opposed to digital bits. In operation of certain embodiments, the weights can be multiplied by input current values 231, 232, 233, 234 to provide output current values that are combined to arrive at a decision of the neural network. In many embodiments, the input current values 231, 232, 233, 234 are provided by an input generator 230. Those skilled in the art will recognize that such input current values can be generated or obtained from a variety of devices or other components within the system. Furthermore, stored charge within a multiplier 210 can shift voltage on the floating gate and scales drain current by weight $w_{i,j}$.

As those skilled in the art can appreciate, the analog multiplier array 200 can utilize standard programming and erase circuitry to generate tunneling and erase voltages.

Figure 3:
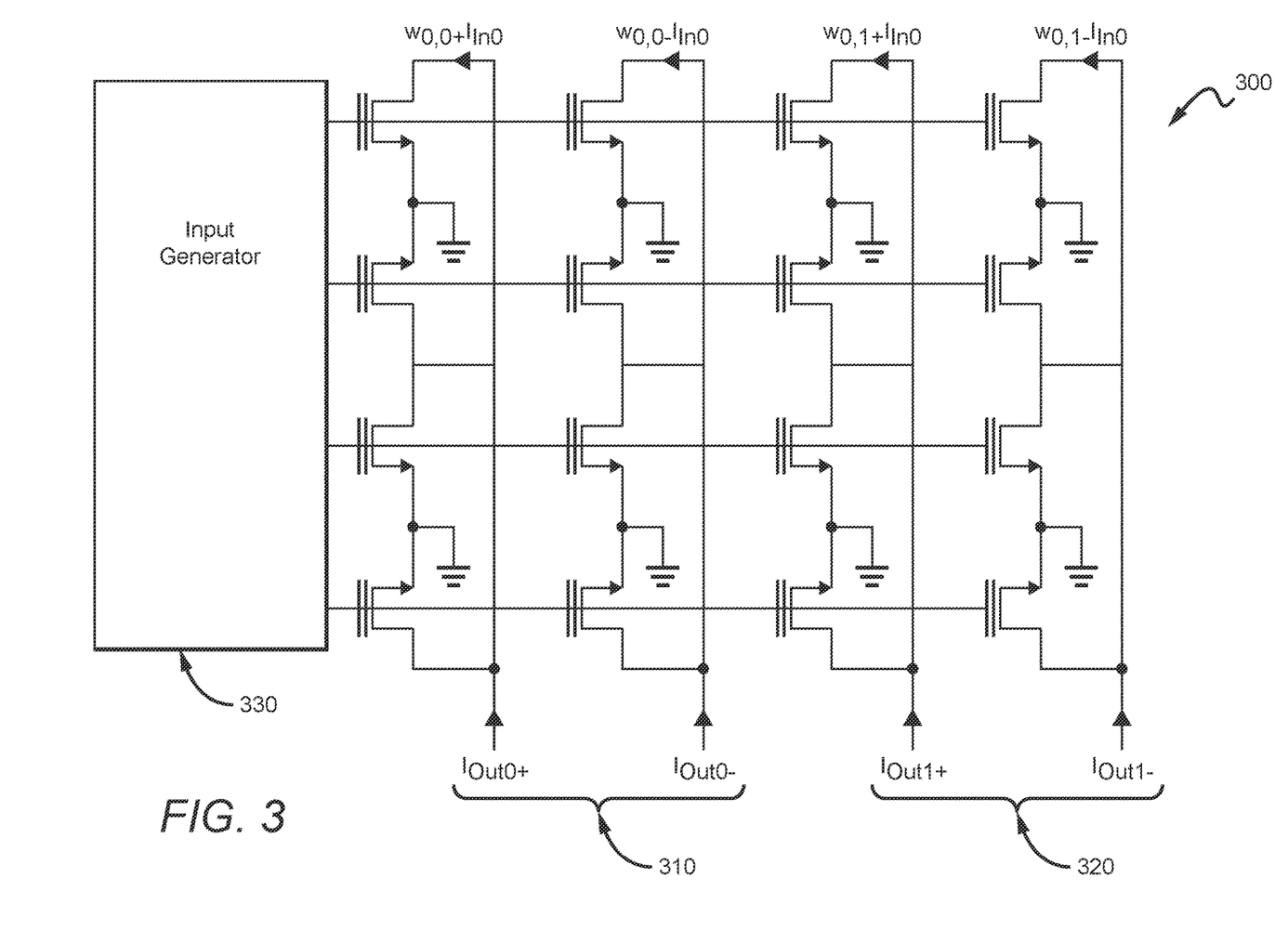
FIG. 3 provides a schematic illustrating an analog multiplier array in accordance with some embodiments.

Referring now to FIG. 3, a schematic illustrating an analog multiplier array 300 is provided in accordance with some embodiments. The analog multiplier array 300 can use two transistors (e.g., a positive transistor and a negative transistor) such as, but not limited to a metal-oxide semiconductor field effect transistor "MOSFET" or field-effect transistor "FET" to perform a two-quadrant multiplication of a signed weight (e.g., a positive weight or a negative weight) and a non-negative input current value. In many embodiments, the input current values can be provided by a separate input generator 330. The input generation of 330 can be similar to that of the input generator depicted in FIG. 2 in certain embodiments. If an input current value provided by the input generator 330 is multiplied by a positive or negative weight, the product or output current value can respectively be either positive or negative. A positively weighted product can be stored in a first column (e.g., column corresponding to $I_{Out0+}$ in the analog multiplier array 300), and a negatively weighted product can be stored in a second column (e.g., column corresponding to $I_{Out0-}$ in the analog multiplier array 300). By way of example and not limitation, $I_{Out0+}$ and $I_{Out0-}$ can be taken as a differential current output 310 that then is provided to a plurality of current-sensing circuitry including, but not limited to, current mirrors, charge integrators, and/or transimpedance amplifiers. The foregoing differential outputs 310, 320 can provide positively and negatively weighted products or output signal values can be taken as a differential current value to provide useful information for making a decision.

Because each output current from the positive or negative transistor is wired to ground and proportional to the product of the input current value and the positive or negative weight, respectively, the power consumption of the positive or negative transistor is near zero when the input current values or weights are at or near zero. That is, if the input signal values are '0,' or if the weights are '0,' then no power will be consumed by the corresponding transistors of the analog multiplier array 300. This is significant because in many neural networks, often a large fraction of the values or the weights are '0,' especially after training. Therefore, energy is saved when there is nothing to do or going on. This is unlike differential pair-based multipliers, which consume a constant current (e.g., by means of a tail bias current) regardless of the input signal.

Figure 4:
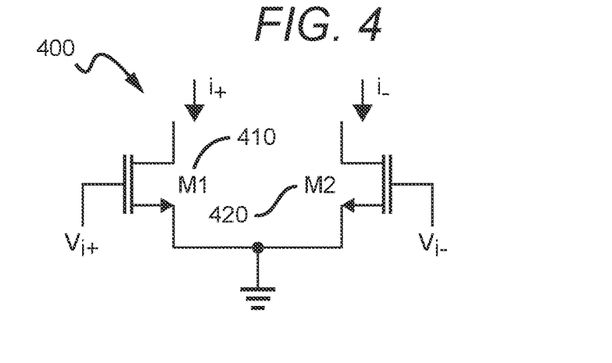
FIG. 4 provides a schematic illustrating a bias-free, two-quadrant multiplier of an analog multiplier array in accordance with some embodiments.

Referring now to FIG. 4, a schematic illustrating a bias-free, two-quadrant multiplier 400 of an analog multiplier array such as the analog multiplier array 300 is provided in accordance with some embodiments. As previously set forth, because each output current from the positive transistor (e.g., positive output current M1 415 of the two-quadrant multiplier 400) or negative transistor (e.g., negative output current M2 425 of the two-quadrant multiplier 400) is proportional to the product of the. input current value and the positive or negative weight, respectively, the power consumption of the positive transistor 430 or negative transistor 440 is near zero when the input current values or weights are near zero. This is unlike differential pair-based multipliers, which consume a constant current (e.g., by means of a tail bias current) regardless of the input signal.

When programming a two-quadrant multiplier such as the bias-free, two-quadrant multiplier 400, it is common to erase each programmable cell (e.g., the cell including positive transistor M1 430 and the cell including negative transistor M2 440) thereof to set the cells to one extreme weight value before setting each of the cells to its target weight value. Extending this to a full array such as the analog multiplier array 300, all of the programmable cells in the full array are set to one extreme weight value before setting each of the cells to its target weight value. When setting the cells to their desired weight values, a problem of overshoot exists if one or more of the cells is set with a higher weight value than targeted: As a result, many or all of the cells in the full array must then be reset to the one extreme weight value before resetting the cells to their target weight values. However, the differential structure of each of the bias-free, two-quadrant multipliers of the analog multiplier arrays provided herein allows for compensating such overshoot by programming, thereby obviating the time-consuming process of erasing and resetting all of the cells in an array.

In an example of compensating for overshoot by programming, a negative voltage input $V_{i-}$ 410 and positive voltage input $V_{i+}$ 420 of the two-quadrant multiplier 400 can be utilized for erasure to set the cells to one extreme weight value. After erasing the cells, if negative voltage input $V_{i-}$ 410 is programmed with too large a weight value, positive voltage input $V_{i+}$ 420 can be programmed with a larger weight value than initially targeted to compensate for the weight value of negative voltage input $V_{i-}$ 410 and achieve the initially targeted effect. Therefore, the differential structure can be exploited to compensate for programming overshoot without having to erase any one or more cells and start over.

Figure 5:
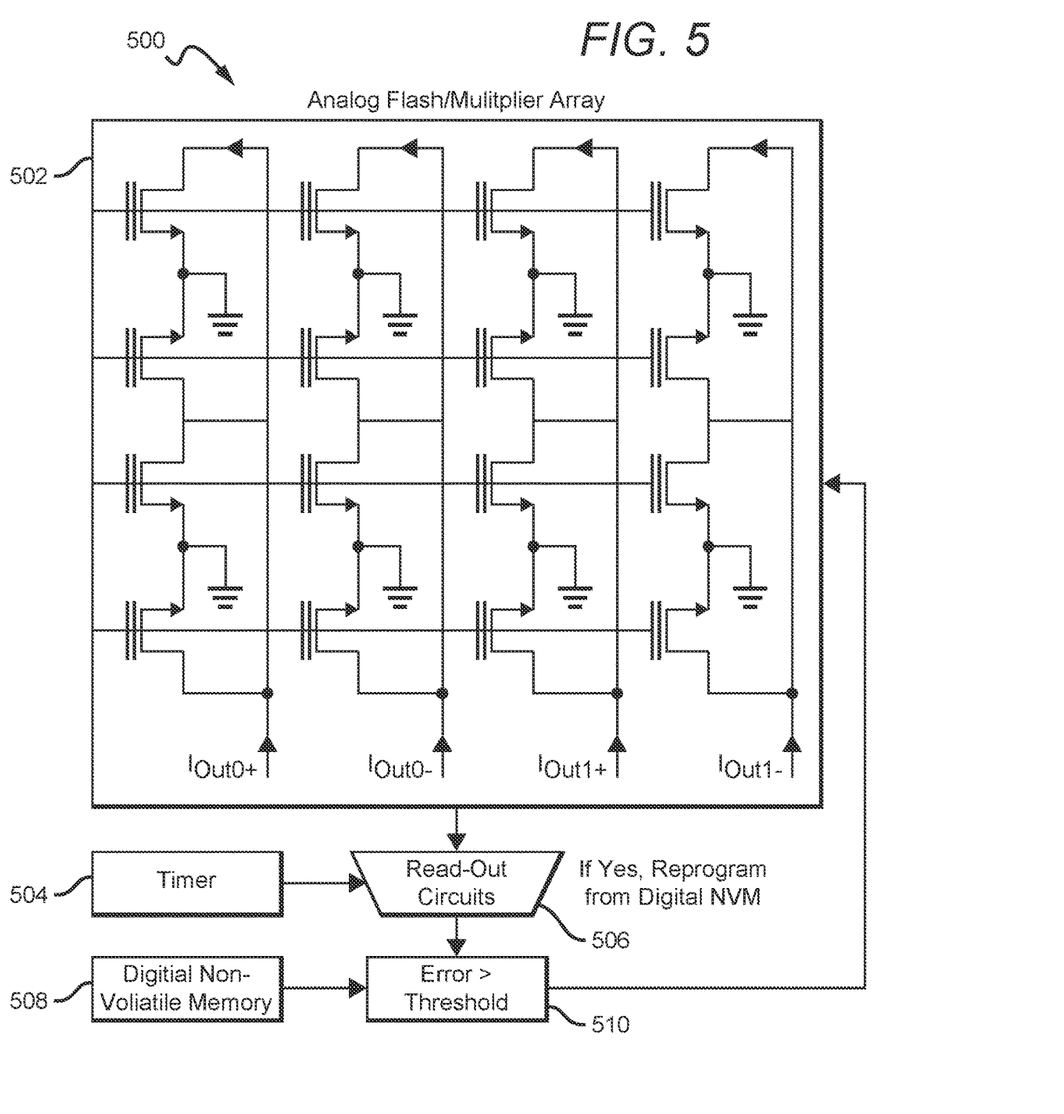
FIG. 5 provides a block diagram of one exemplary embodiment of a system for reprogramming an analog flash/multiplier array including a schematic illustrating the analog flash/multiplier array.

Referring now to FIG. 5, a block diagram of one exemplary embodiment of a system for reprogramming an analog flash/multiplier array including a schematic illustrating the analog flash/multiplier array is shown. The system 500 includes the analog flash/multiplier array ("analog array") 502, a timer 504, read-out circuitry 506 and a digital non-volatile memory 508. The analog array 502 may be comprised of a NOR flash array including a plurality of floating-gate transistors that store a plurality of values (as used herein, the use of the term "NOR" refers to Boolean logic). The floating-gate transistors may serve a dual-purpose: (i) conduct a current that is the function of an input, and (ii) store the corresponding values. In some embodiments, the values stored by the analog array 502 may be weights used within a neural network. In other embodiments, the values may be used as parameters in logic functions that perform mathematical operations and/or computations (e.g., a filter such as coefficients in an infinite impulse response (IIR) filter and/or a finite impulse response (FIR) filter). In yet other embodiments, the values may be used as parameters in a programmable equalizer.

The values may be maintained within the circuitry comprising the analog array 502 based on the insulative properties of the dielectric surrounding the floating-gate transistors of the analog array 502. Specifically, a charge may be added to or removed from the floating-gate arrays by inducing, for example, electric fields within a predetermined distance from the floating-gate transistors. Under "typical" conditions, e.g., no exposure of the floating-gate transistors to an electric field above a predefined strength (i.e., charge), the charge residing on the floating-gate transistors will remain for a significant amount of time.

Although not shown, the analog array 502 may be coupled to an array of input drivers that provide analog input signals. In certain embodiments, these may be similar to the input generators depicted in FIG. 2 and/or FIG. 3. Additionally, the analog array may be coupled to at least one output sense circuit configured to receive (e.g., read) output, e.g., one or more currently values, and provide the output as input to a subsequent processing stage. For example, the output of the analog array 502 may be considered a "feature vector" that is an input to a first layer of a neural network (e.g., the feature vector may be a set of image pixels, a filtered output from filtering an audio signal, etc.).

Still referring to FIG. 5, the digital non-volatile memory 508 may be, inter alia, resistive random-access memory "RRAM" or silicon-oxide-nitrate-oxide-silicon "SONOS" memory. In other embodiments, other types of well-known non-volatile memory may be utilized, but are not limited to including read-only memory "ROM", non-volatile random-access memory "NVRAM" mechanical storage (e.g., hard disk drive, optical disc drive), etc. In a number of embodiments, the digital non-volatile memory 508 may be onboard memory within the system. In additional embodiments, the digital non-volatile memory 508 may be external in relation to the system. In still more embodiments, the digital non-volatile memory 508 may comprise a mixture of both onboard and external memory. In certain embodiments, the digital memory may comprise volatile memory instead of non-volatile memory including, but not limited to, static RAM "SRAM" and/or dynamic RAM "DRAM." In still more embodiments, the system 500 may include a mixture of both volatile and non-volatile memory 508. Those skilled in the art will recognize that any suitable memory technologies may be utilized as a substitute for either the volatile or non-volatile memory in the system 500 and may be located either internally and/or externally based on the particular requirements of the application.

The timer 504 is configured to transmit a signal to the read-out circuitry 506 at predetermined intervals (e.g., periodically). In certain embodiments, the signal may include, but is not limited to voltage signals, current signals, and/or logic signals. Example intervals may include, but are not limited or restricted to, one minute, two minutes, one hour, 24 hours, one week, etc. Additionally, the intervals at which the timer 504 can transmit a signal may be dynamically adjustable (i.e., reprogrammed to be a different duration). In additional embodiments, input (e.g., from a human analyst) may cause a signal to be transmitted to the read-out circuitry 506. The timer 504 transmits a signal to the read-out circuitry 506 to initiate operations causing the read-out circuitry 506 to retrieve values stored in the analog array 502. Additionally, the read-out circuitry 502 retrieves values stored in the digital non-volatile memory 508. Subsequently, the read-out circuitry 502 may perform a comparison 510 of the values retrieved from the analog array 502 and the values retrieved from the digital non-volatile memory 508 to determine whether any degradation of the values stored by the analog array 502 has occurred. The values stored within the digital non-volatile memory 508 may be a set of ranges or a set of specific values. For example, when the values stored in the digital non-volatile memory 508 are a set of ranges, the comparison 510 may determine whether the values retrieved from the analog array 502 are within the stored ranges. In such an embodiment, the threshold used in determining whether to initiate a reprogramming process of the analog array 502 may be a predefined threshold number such that when the number of values retrieved from the analog array 502 that are outside of the corresponding ranges meets or exceeds the predefined threshold number, the reprogramming process is initiated.

In an alternative example, when the values stored in the digital non-volatile memory 508 may be a set of specific values. In such an example, the comparison 510 may determine whether the values retrieved from the analog array 502 are within specific threshold percentages (e.g., 90-110%) of the values stored in the digital non-volatile memory 508. In such an embodiment, the threshold used in determining whether to initiate a reprogramming process of the analog array 502 may be a predefined threshold percentage range such that when one or more values retrieved from the analog array 502 are outside of the corresponding ranges meets or exceeds the predefined threshold percentage, the reprogramming process can be initiated.

When the comparison 510 results in an error above a predefined threshold, the read-out circuitry 506 may initiate an operation to reprogram the analog array 502 using the values stored in the digital non-volatile memory 508. In some embodiments, the error includes a difference between one or more of the values retrieved from the analog array and the corresponding values stored in the digital non-volatile memory. In such embodiments, the threshold includes a predefined percentage. In other embodiments, the error includes a number of values retrieved from the analog array outside of the corresponding ranges stored in the digital non-volatile memory. In such embodiments, the threshold includes a predefined number of values or a predefined percentage of the values.

Figure 6:
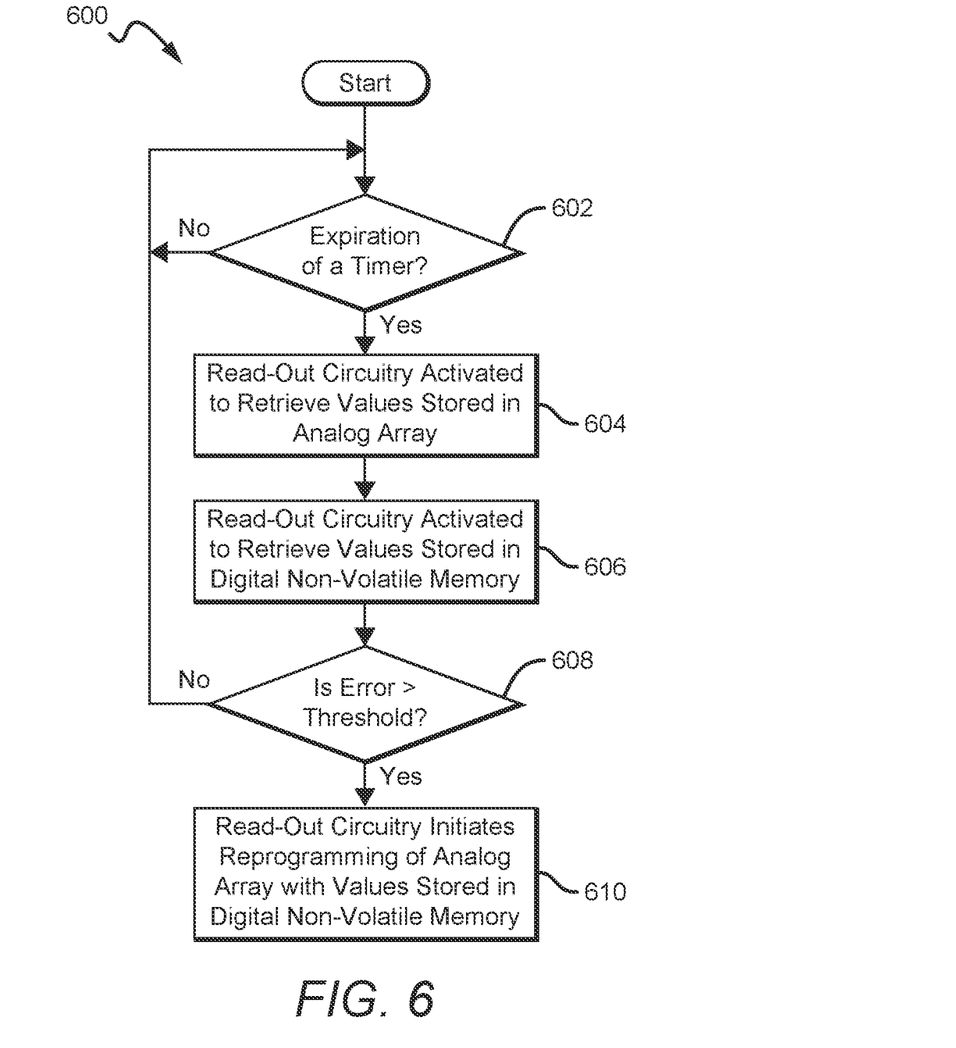
FIG. 6 provides an illustration of an exemplary method for reprogramming values within an analog array in response to detecting an error with values stored within the analog array.

Referring now to FIG. 6, an illustration of an exemplary method for reprogramming values within an analog array in response to detecting an error with values stored within the analog array is shown. Each block illustrated in FIG. 6 represents an operation performed in the method 600 of reprogramming values with an analog array in response to detecting an error with the values stored therein. The method 600 starts at block 602 and proceeds to block 604 when an expiration of a timer has occurred. As discussed above, the timer may be configured to expire at periodic intervals. When the timer expires (yes at block 602), a signal is transmitted to read-out circuitry such as, for example, the system 500 illustrated in FIG. 5, which can result in the activation of the read-out circuitry to retrieve values stored in an analog array such as the array 502 depicted in FIG. 5 (block 604).

Additionally, in response to receiving the signal as a result of the expiration of the timer, many embodiments of the read-out circuitry retrieve values stored in a digital non-volatile memory (block 606). It should be noted that blocks 604 and 606 do not have to be performed in a particular order. For example, the operations of blocks 604 and 606 may be performed as illustrated in FIG. 6, and in a second embodiment, the operations of block 606 may be performed prior to the performance of the operations of block 604. In yet another embodiment, the operations of blocks 604 and 606 may be performed concurrently (at least partially overlapping in time).

In response to the completion of the operations of blocks 604 and 606, the read-out circuitry can perform a comparison of the values retrieved from the analog array and the values retrieved from the digital non-volatile memory (block 608). In a number of embodiments, the read-out circuitry analyzes the results of the comparison to determine whether an error greater than or equal to a predefined threshold exists (e.g., whether the values stored in the analog array have suffered from voltage drift or current leakage). In response to the existence of an error above the predefined threshold (yes at block 608), the read-out circuitry can initiate operations to automatically reprogram the analog array with the values stored in the digital non-volatile memory (block 610). In one embodiment, a microcontroller and/or a state machine may be included to execute the reprogramming of the analog array as well as the timer and read-out circuitry as depicted in FIG. 5. In some embodiments, the analog array, the timer, the read-out circuitry, and a microcontroller and/or a state machine are included on an integrated controller.

Some advantages of utilizing an analog array, e.g., such as the analog array 502 of FIG. 5, instead of digital memory to supply input to a first layer of a neural network include, but are not limited or restricted to, increased speed, increased density (i.e., more values, e.g., weights, stored in a given area of an IC), a lower energy cost in processing the values to provide output (e.g., in an analog array, the storage element and the multiplier are the same transistor so there is no energy or time cost to move data from memory to the multiplier), and/or improved power efficiency.

Additionally, in some embodiments, a memory refresh process (e.g., reprogramming the analog array based on the digital memory) may be made invisible to the user by performing a refresh that occurs in the background from the user's perspective ("a background refresh"). By performing a memory refresh as a background refresh, the user experience is uninterrupted (or negligibly interrupted). In one such embodiment, a duplicate of the active analog memory may be re-programmed such that the active analog memory is substituted (e.g., exchanged) with the duplicate. In a second such embodiment, the active analog memory may be divided into unit memory banks, e.g., into N unit memory banks (wherein N≥1). For example, each unit memory bank may have the same storage capacity such that each unit memory bank would require 1/N of the total memory storage capability (e.g., N being a factor of the total size of the active analog memory). Utilizing one additional redundant unit memory bank would then result in a refresh of the entire active analog memory in N cycles. In the second embodiment, the analog memory overhead required for background updates is limited to 1/N of the total active analog memory content.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A method, comprising:
responsive to receiving a signal, retrieving:
one or more first values stored in an analog array; and
one or more second values stored in a digital memory;
performing operations comprising a comparison of one or more of the first values and one or more of the second values;
analyzing results of the comparison to determine whether a result is greater than or equal to a predefined threshold; and
initiating operations to reprogram the analog array with one or more of the second values.

2. The method of claim 1, wherein the received signal is received from a timer.

3. The method of claim 2, wherein the received signal is generated in response to an expiration of the timer.

4. The method of claim 3, wherein the expiration of the timer is configured to expire at one or more predetermined intervals.

5. The method of claim 4, wherein the one or more predetermined intervals are selected from the set comprising: one minute, two minutes, one hour, twenty-four hours, or one week.

6. The method of claim 4, wherein the one or more predetermined intervals are dynamically generated.

7. The method of claim 1, wherein the signal is received by circuitry.

8. The method of claim 7, wherein the signal is a voltage signal.

9. The method of claim 7, wherein the signal is a logic signal.

10. The method of claim 7, wherein retrieval of the one or more first and second values is done by the circuitry.

11. The method of claim 1, wherein the reprogramming operations are initiated responsive to a determination that the results are greater or equal to the predefined threshold.

12. The method of claim 11, wherein the threshold includes a predefined percentage.

13. The method of claim 12, wherein the predefined threshold percentage is between ninety and one-hundred and ten percent of one or more of the second values.

14. The method of claim 1, wherein the results comprise an error.

15. The method of claim 14, wherein the error is between the one or more first and second values.

16. The method of claim 14, wherein the error is generated upon a determination that one or more of the first values do not correspond to one of the second values.

17. The method of claim 14, wherein the error is produced from a voltage drift within the analog array.

18. The method of claim 14, wherein the error is produced from a current leakage within the analog array.

19. The method of claim 1, wherein the analog array is configured to supply an input to a first layer of a neural network.

20. The method of claim 1, wherein the reprogramming of the analog array is done automatically upon the determination of a result greater than or equal to the predetermined threshold.

* * * * *